No. 830,346. PATENTED SEPT. 4, 1906
B. MAYER.
APPARATUS FOR GRINDING BOTH FIELDS OF BIFOCAL LENSES SIMULTANEOUSLY.
APPLICATION FILED NOV. 13, 1905.
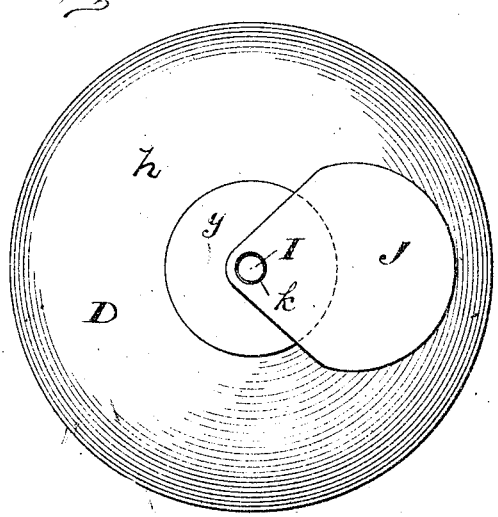
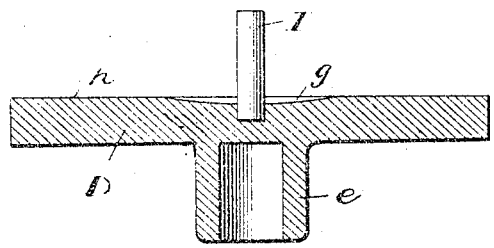
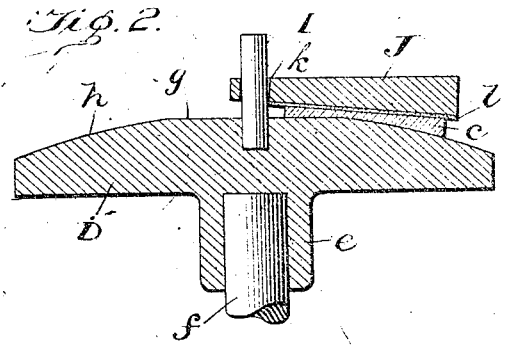
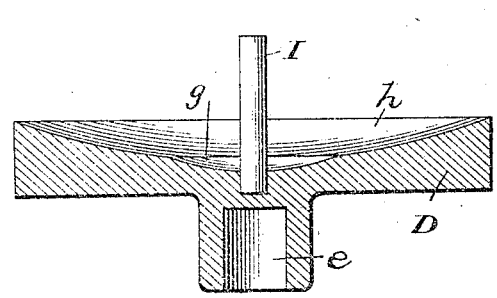
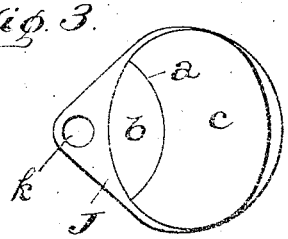
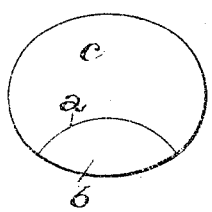
Witnesses
G. Ferd. Vogt.
Edwin L. Bradford
Inventor
Benjamin Mayer
By Mann & Co,
Attorney

UNITED STATES PATENT OFFICE.

BENJAMIN MAYER, OF BALTIMORE, MARYLAND.

APPARATUS FOR GRINDING BOTH FIELDS OF BIFOCAL LENSES SIMULTANEOUSLY.

No. 830,346.  Specification of Letters Patent.  Patented Sept. 4, 1906.

Application filed November 18, 1905. Serial No. 287,930.

*To all whom it may concern:*

Be it known that I, BENJAMIN MAYER, a citizen of the United States, residing at Baltimore, in the State of Maryland, have invented certain new and useful Improvements in Apparatus for Grinding Both Fields of Bifocal Lenses Simultaneously, of which the following is a specification.

This invention relates to means for grinding bifocal optical lenses.

One object of the invention is to provide apparatus for grinding a single piece of glass to form the two fields of a bifocal lens simultaneously.

The invention is illustrated in the accompanying drawings, in which—

Figure 1 is a top or plan view of the grinding apparatus; Fig. 2, a vertical section of the grinding apparatus and of a glass lens in position thereon. Fig. 3 is an inverted plan view of the lens-holder and a glass lens cemented thereto. Figs. 4 and 5 are vertical sections of the grinding-disk, which differ from the one shown in Figs. 1 and 2 and from each other only in the particular shape of the two grinding-faces on the disk. Fig. 6 is a front view of a solid or single-piece bifocal lens as made by the improved grinding apparatus and shows the arched line which makes the division between the two fields of the lens.

The bifocal lens ground by the apparatus herein claimed is a single piece of glass, and the letter $b$ in the drawings designates the lower or near field, the upper or distant field, and $a$ the arched line over the lower field. This arched division-line is the only separation between the two fields and forms neither a crease nor a projecting ridge, and when eyeglasses or spectacles with this style of lens are worn the said arched line is scarcely visible. To grind this lens, I employ a revoluble grinding-disk D, which has at its lower side a well-known form of socket $e$ and is mounted on an upright shaft $f$. The upper surface of the disk has two distinct circular grinding-surfaces $g$ and $h$, which are closely adjoining, one being at the center and the other concentric or surrounding it. These two grinding-surfaces differ from each other—as, for instance, one may be a flat plane and the other a convex or a concave. The smaller and central surface $g$ serves to grind the lower or near field of the lens, and the surrounding surface $h$ grinds the upper or distant field of the lens. In Figs. 1 and 2 the central grinding-surface $g$ is flat and the concentric grinding-surface $h$ is convex. Of course it is to be understood that the degree of convexity may be varied to meet the requirements of different lenses.

A stud or pin I is suitably secured at the center of the disk and center of the small grinding-surface and projects upward. A lens-holder comprises a block J of suitable shape and means for connecting the block with the said center stud, whereby the block may be retained in stationary position while the grinding-disk revolves. The shape and size of the block J must be such that it will properly overlap onto both of the two grinding-surfaces $g$ $h$. In the present instance the lens-holder block has a hole $k$ of the size of or a little larger than the stud I, so that it will take over the stud, as shown, and this hole constitutes one means for connecting the lens-holder with the center stud. The block J has sufficient width of face at one side of the hole $k$ to receive the glass lens. The block has position above the grinding-disk with said hole coincident with the axis of the disk.

The glass lens before it is ground is to be secured to the lens-holder, as usual, by cement $l$.

In grinding the piece of glass $c$, which is cemented to the block J, overlaps both grinding-surfaces and has a portion in contact with one grinding-surface and a different portion in contact with the other grinding-surface at the same time. The disk with the two grinding-surfaces revolves, the lens-holder is retained in the same relation to both surfaces by connection with the center stud, and it is only necessary to keep the lens-holder from movement while the grinding operation proceeds.

As already indicated, the character of the two grinding-surfaces of any one disk may be varied without limit to meet the requirements of the manufacturing optician. Figs. 4 and 5 show two examples. Fig. 4 shows the section of a form of disk where the center grinding-surface is concave and the concentric grinding-surface is flat. Fig. 5 shows the section of a form of disk where the center grinding-surface is concave and the concentric grinding-surface also concave, but of a different degree or radius.

Having thus described my invention, what I claim as new, and desire to secure by Letters Patent, is—

1. A revoluble grinding-disk having two distinct circular grinding-surfaces—one concentric with respect to the other; a stud projecting at the center; and a lens-holder retained in place by connection with said center stud and overlapping both of said two grinding-surfaces, whereby a solid or single glass may have two lenses of different foci ground simultaneously.

2. An apparatus for grinding both fields of bifocal lenses, comprising a revoluble disk having two different grinding-surfaces—one being concentric with respect to and immediately adjoining the other and one of said surfaces adapted to grind the near field and the other adapted to grind the distance field; a lens-holding block having a hole and adapted to overlap both of said two grinding-surfaces at the same time; and means connecting with said hole to retain the lens-holding block in position overlapping both grinding-surfaces.

In testimony whereof I affix my signature in presence of two witnesses.

BENJAMIN MAYER.

Witnesses.
CHAS. B. MANN,
JOHN W. HEWES.